United States Patent
Ota et al.

(10) Patent No.: US 10,996,348 B2
(45) Date of Patent: May 4, 2021

(54) GAMMA RAY DETECTOR

(71) Applicant: HAMAMATSU PHOTONICS K.K., Hamamatsu (JP)

(72) Inventors: Ryosuke Ota, Hamamatsu (JP); Motohiro Suyama, Hamamatsu (JP); Hideki Shimoi, Hamamatsu (JP)

(73) Assignee: HAMAMATSU PHOTONICS K.K., Hamamatsu (JP)

(*) Notice: Subject to any disclaimer, the term of this patent is extended or adjusted under 35 U.S.C. 154(b) by 200 days.

(21) Appl. No.: 16/394,032

(22) Filed: Apr. 25, 2019

(65) Prior Publication Data
US 2019/0331617 A1  Oct. 31, 2019

(30) Foreign Application Priority Data
Apr. 26, 2018 (JP) .............................. JP2018-085410

(51) Int. Cl.
*G01T 1/22* (2006.01)
*G01T 1/24* (2006.01)
*G01T 1/20* (2006.01)
*G01T 1/202* (2006.01)
G01N 23/095 (2018.01)

(52) U.S. Cl.
CPC .................. *G01T 1/22* (2013.01); *G01T 1/20* (2013.01); *G01T 1/2002* (2013.01); *G01T 1/202* (2013.01); *G01T 1/2018* (2013.01); *G01T 1/248* (2013.01); *G01N 23/095* (2018.02)

(58) Field of Classification Search
CPC ....... G01T 1/2018; G01T 1/2002; G01T 1/20; G01T 1/202; G01T 1/22; G01T 1/248
USPC ...................................... 250/370.09
See application file for complete search history.

(56) References Cited

U.S. PATENT DOCUMENTS

| | | | | |
|---|---|---|---|---|
| 5,848,124 A | * | 12/1998 | Inazuru | B23K 1/0008 378/140 |
| 2011/0163236 A1 | * | 7/2011 | Arodzero | G01N 23/04 250/361 R |

OTHER PUBLICATIONS

R. Dolenec et al., The Performance of Silicon Photomultipliers in Cherenkov TOF PET, IEEE Transactions on Nuclear Science, Oct. 2016, pp. 2478-2481, vol. 63, No. 5.

* cited by examiner

*Primary Examiner* — David P Porta
*Assistant Examiner* — Abra S Fein
(74) *Attorney, Agent, or Firm* — Faegre Drinker Biddle & Reath LLP

(57) ABSTRACT

A gamma ray detector is a detector detecting gamma rays and includes a photomultiplier tube having an entrance window and a photoelectric surface. The entrance window is a Cherenkov radiator. The photoelectric surface is formed on a vacuum side of the entrance window via an intermediate layer. The thickness of the intermediate layer is equal to or less than the wavelength of Cherenkov light emitted by an interaction of the gamma rays with the entrance window.

7 Claims, 4 Drawing Sheets

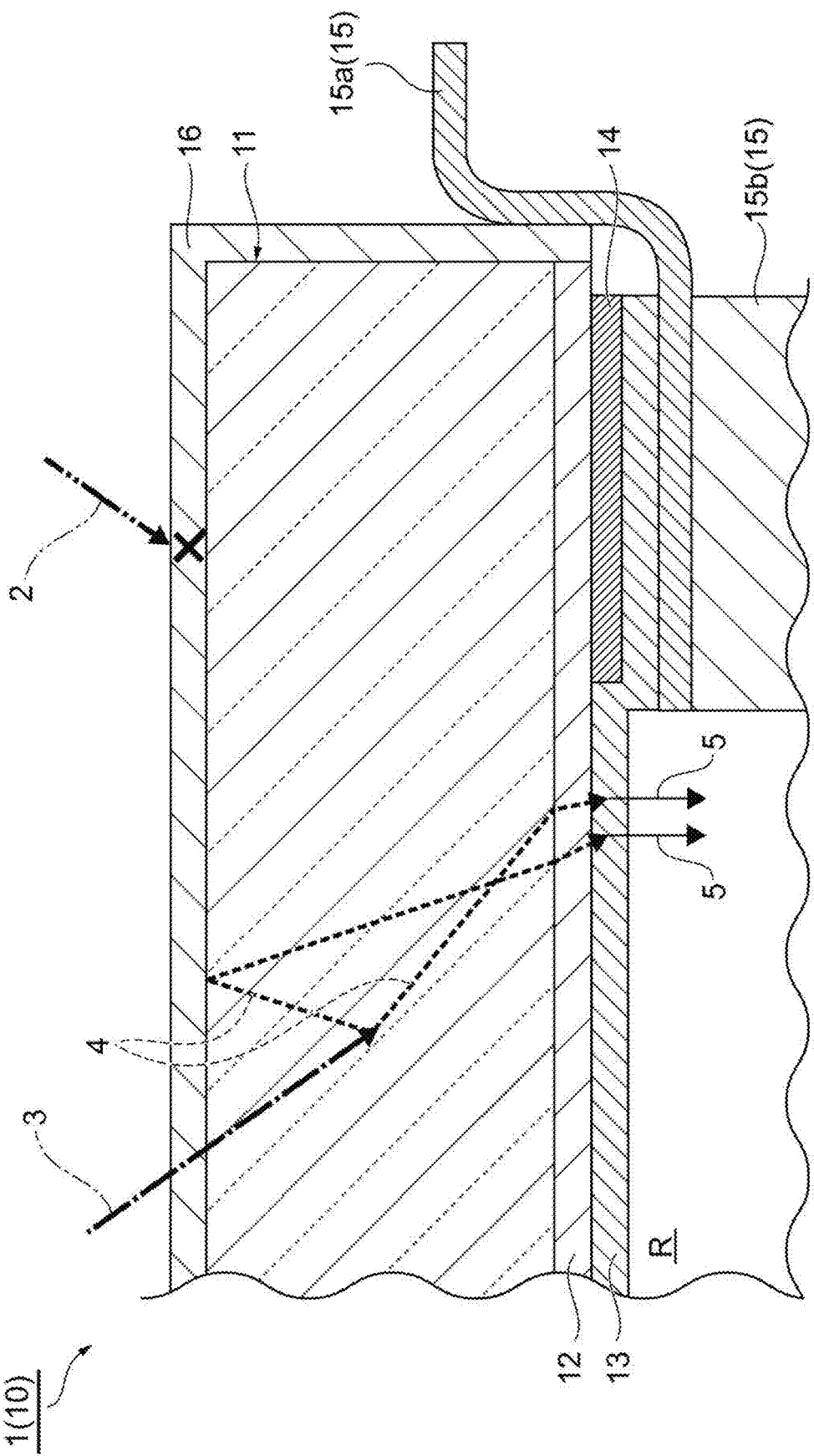

GAMMA RAY DETECTOR

TECHNICAL FIELD

One aspect of the present invention relates to a gamma ray detector.

BACKGROUND

Conventionally, a gamma ray detector including a photomultiplier tube having an entrance window and a photoelectric surface, and a Cherenkov radiator adhered to the outer surface of the entrance window with an optical adhesive is known (see, for example, R. Dolenec et al., "The Performance of Silicon Photomultipliers in Cherenkov TOF PET", Trans. Nucl. Sci., vol 63, NO 5, 2016, p. 2478-2481).

SUMMARY

In the gamma ray detector as described above, due to the difference in refractive indexes between the Cherenkov radiator and the optical adhesive and between the optical adhesive and the entrance window, at least a part of Cherenkov light emitted by the Cherenkov radiator may repeat reflections at an interface between them. In this case, the Cherenkov light is absorbed by the Cherenkov radiator, the number of detected photons of the photomultiplier tube decreases, and detection efficiency and temporal resolution of gamma rays may decrease.

An aspect of the present invention is to provide a gamma ray detector capable of improving detection efficiency and temporal resolution of gamma rays.

A gamma ray detector according to an aspect of the present invention is a detector detecting gamma rays including a photomultiplier tube having an entrance window and a photoelectric surface, in which the entrance window is a Cherenkov radiator, the photoelectric surface is formed on a vacuum side surface of the entrance window via an intermediate layer, and a thickness of the intermediate layer is equal to or less than a wavelength of Cherenkov light emitted by an interaction of the gamma rays with the entrance window.

In this gamma ray detector, the entrance window of the photomultiplier tube is a Cherenkov radiator. Thus, refraction and reflection of Cherenkov light between the Cherenkov radiator and the optical adhesive or between the optical adhesive and the entrance window do not exist in the first place, and Cherenkov light can be efficiently collected. By forming the intermediate layer, it is possible to prevent the Cherenkov radiator from being colored by a reaction between the Cherenkov radiator and the photoelectric surface, and it is possible to prevent the Cherenkov light from being absorbed by the coloring. Since the thickness of the intermediate layer is equal to or less than the wavelength of Cherenkov light, refraction and reflection of Cherenkov light between the Cherenkov radiator and the intermediate layer can be suppressed and the Cherenkov light can be efficiently collected. As described above, according to one aspect of the present invention, it is possible to improve detection efficiency and temporal resolution of gamma rays.

In the gamma ray detector according to one aspect of the present invention, the intermediate layer may contain at least one of $Al_2O_3$, ZnO, $HfO_2$, and $TiO_2$. In this case, at least one of $Al_2O_3$, ZnO, $HfO_2$, and $TiO_2$ can be used as the intermediate layer.

In the gamma ray detector according to one aspect of the present invention, the entrance window which is a Cherenkov radiator may contain at least one of $PbF_2$, $PbWO_4$, PbO, and lead glass. In this case, at least one of $PbF_2$, $PbWO_4$, PbO, and lead glass can be used as the entrance window which is a Cherenkov radiator.

In the gamma ray detector according to one aspect of the present invention, the thickness of the entrance window which is a Cherenkov radiator may be a thickness capable of shielding the gamma rays so that the transmittance of the gamma rays is equal to or less than a specified value. This makes it possible to block the gamma rays incident from the entrance window which is a Cherenkov radiator so as to stop at the entrance window.

BRIEF DESCRIPTION OF THE DRAWINGS

FIG. 4 is an enlarged cross-sectional view of a part of FIG. 3.

DETAILED DESCRIPTION

Figure 1:
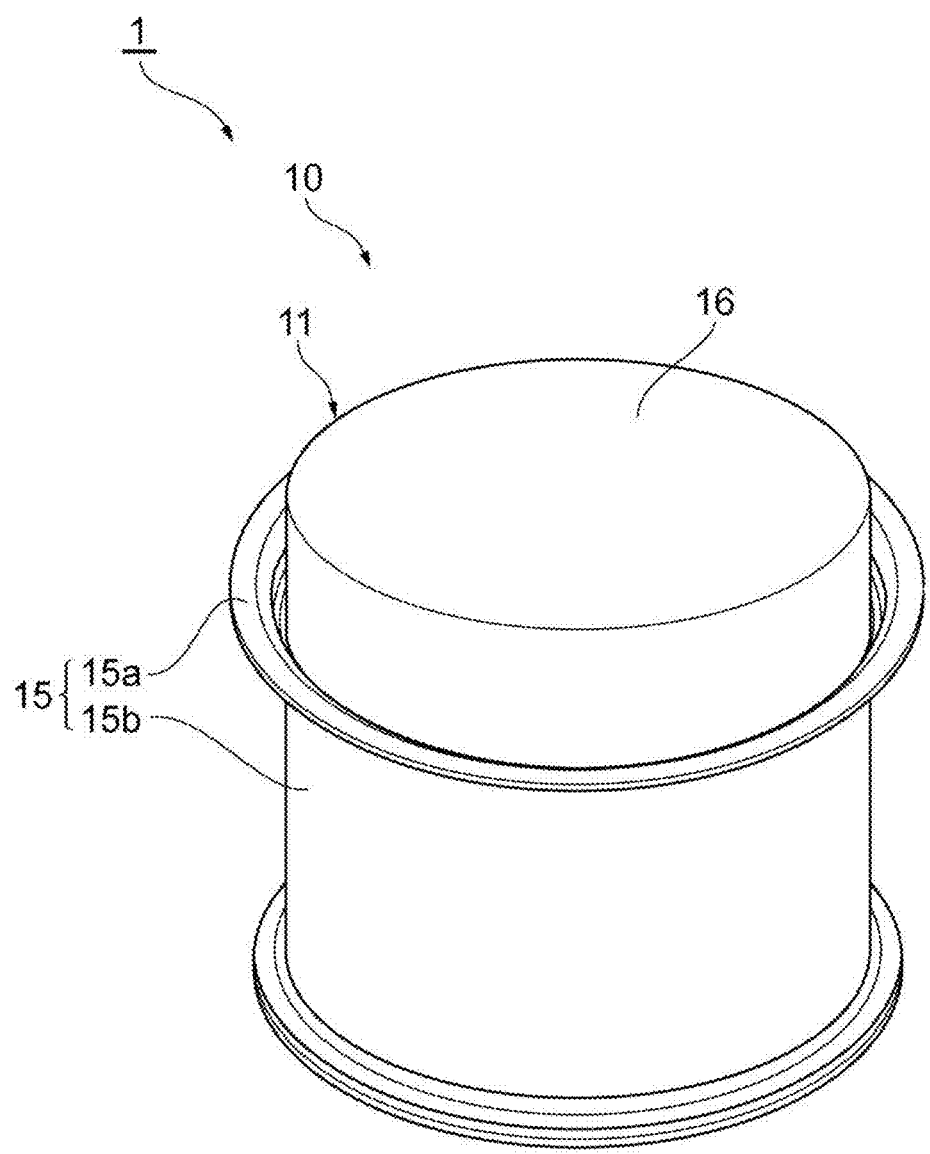
FIG. 1 is a perspective view showing a gamma ray detector according to an embodiment.

Hereinafter, embodiments will be described in detail with reference to the drawings. Identical or corresponding parts are denoted by the same reference numerals, and redundant explanations are omitted. The dimensional ratio in each drawing is not necessarily coincident with the actual dimensional ratio.

Figure 2:
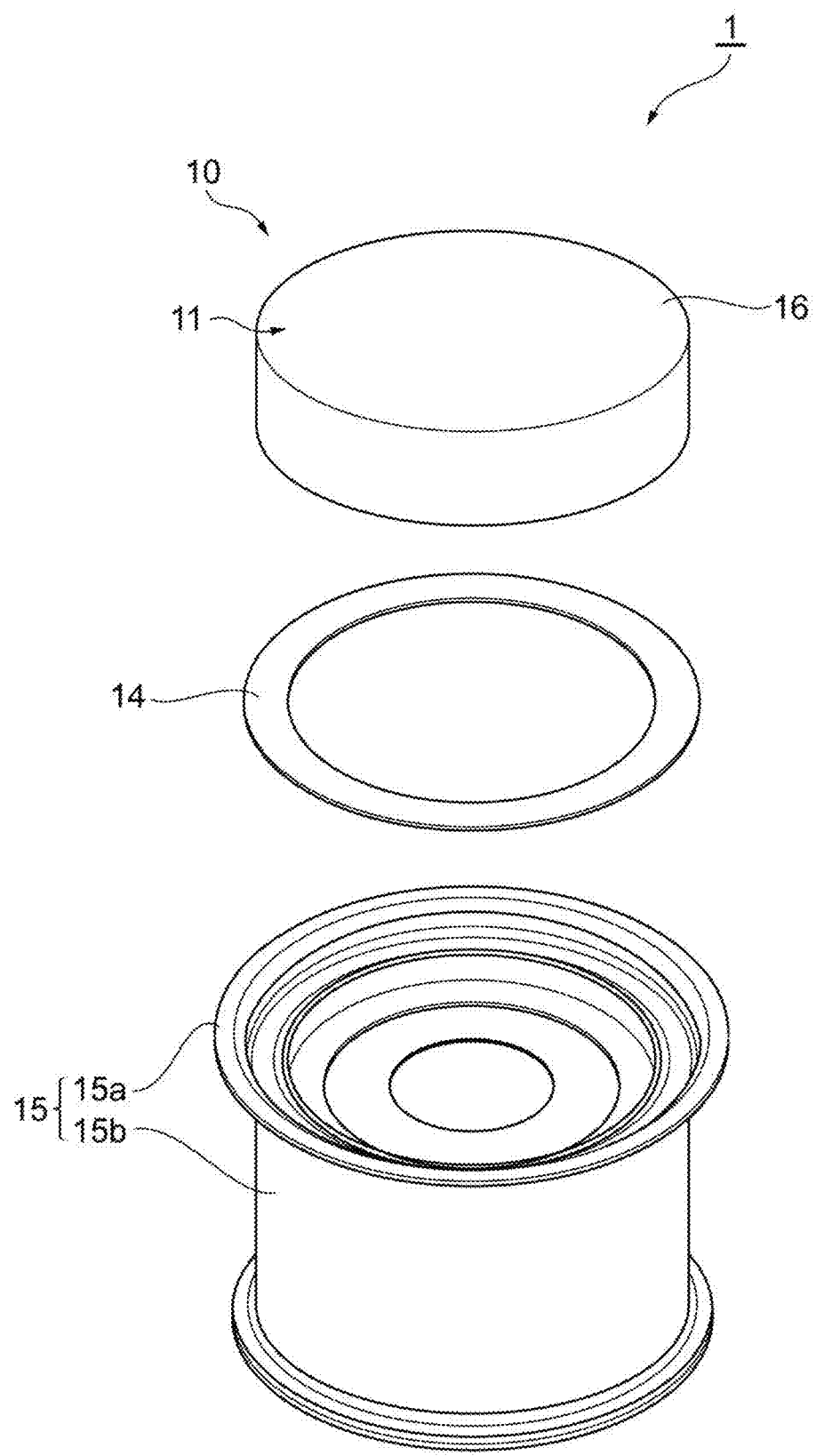
FIG. 2 is an exploded perspective view of the gamma ray detector of FIG. 1.
Figure 3:
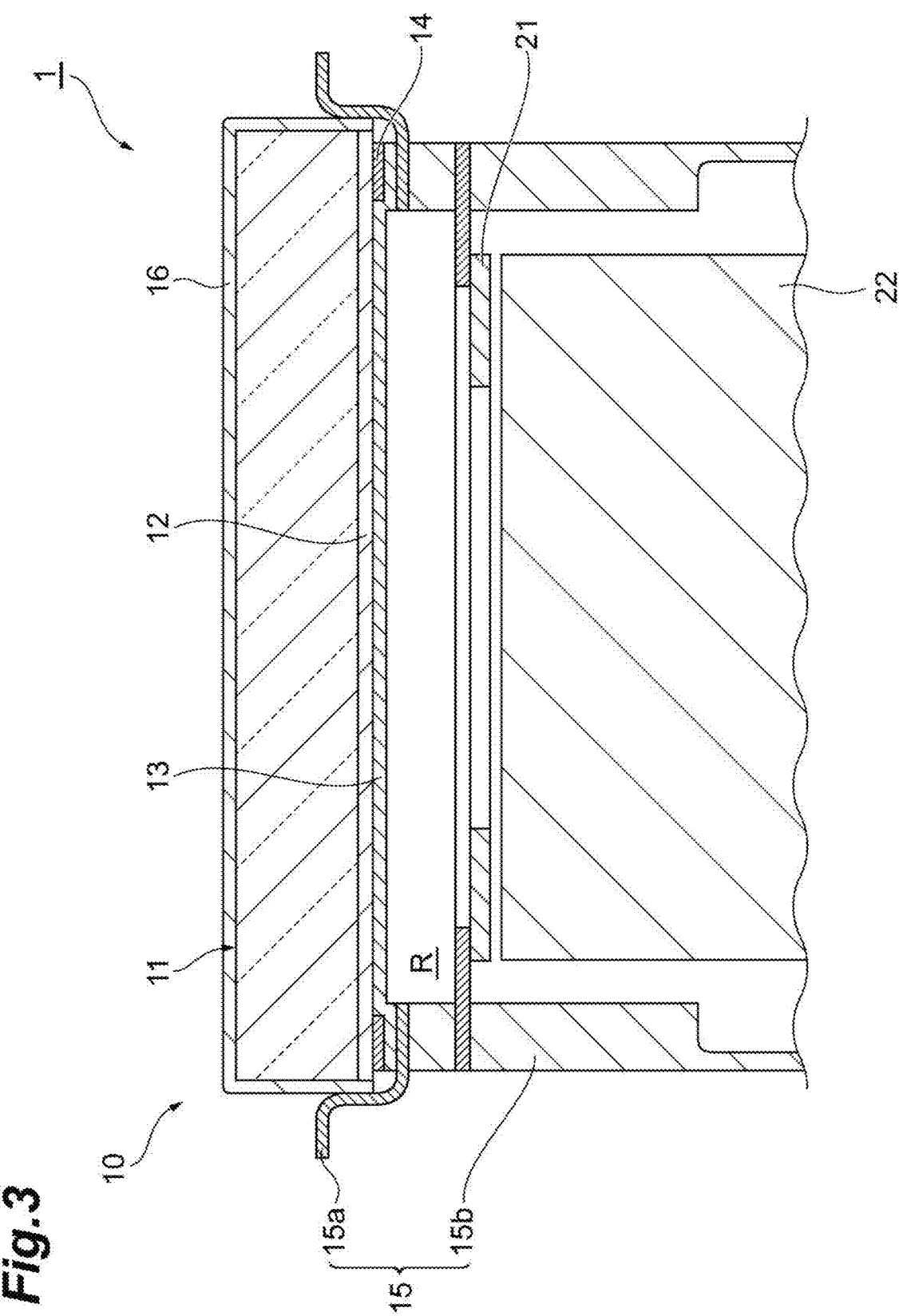
FIG. 3 is a cross-sectional view of the gamma ray detector of FIG. 1.

As shown in FIGS. 1 to 3, a gamma ray detector 1 is a detector that detects gamma rays using Cherenkov light. The gamma ray detector 1 is used, for example, in a positron emission tomography apparatus (so-called time of flight positron emission tomography (TOF-PET)) which uses time-of-flight information of annihilation radiation for image reconstruction. The gamma ray detector 1 includes a photomultiplier tube 10.

The photomultiplier tube 10 is an electron tube having a vacuum internal space R, which detects weak light and converts it into an electrical signal. The photomultiplier tube 10 is a head-on type photomultiplier tube. The photomultiplier tube 10 includes an entrance window 11, an intermediate layer 12, a photoelectric surface 13, a hermetic sealing material 14, a cylindrical member 15, and a reflective material 16.

The entrance window 11 is a member in which gamma rays are incident. The entrance window 11 has a cylindrical or rectangular parallelepiped shape. The entrance window 11 is provided so as to seal one opening end of the cylindrical member 15. The entrance window 11 of the present embodiment is a Cherenkov radiator. The entrance window 11 which is a Cherenkov radiator interacts with incident gamma rays and emits Cherenkov light (converted light). A Cherenkov radiator is also called a Cherenkov radiant body.

The entrance window 11 which is a Cherenkov radiator contains at least one of $PbF_2$ (lead fluoride), $PbWO_4$ (lead tungstate), PbO (lead monoxide), lead glass, and $BiF_3$ (bismuth fluoride). The entrance window 11 can be formed of a crystallized material. The entrance window 11 contains atoms of high atomic number. In the entrance window 11, the lead content is set to a fixed value or more. The fixed value is not particularly limited and can be appropriately set according to specifications, applications, or required workability.

Lead glass contained in the entrance window 11 which is a Cherenkov radiator (hereinafter, simply referred to as "lead glass") has a lead content of about several percent or more. Lead glass is an amorphous glass material. In lead glass, lead is mixed with silicon dioxide as an oxide. Lead glass is a material with good workability and can be easily applied to the entrance window 11 of various shapes or thicknesses. The use of lead glass for the entrance window 11 is suitable for forming modules according to various applications. Lead glass has a characteristic that efficiency of converting gamma rays to Cherenkov light and transmittance and refractive index of light of 400 nm or less become higher as the lead content increases.

The thickness of the entrance window 11 which is a Cherenkov radiator is a thickness capable of shielding gamma rays so that the transmittance of the gamma rays is equal to or less than a specified value. The thickness of the entrance window 11 is the dimension in the axial direction (the vertical direction in the drawings). The specified value is not particularly limited, and can be appropriately set according to specifications, applications, or required workability. The thickness of the entrance window 11 is, for example, 20 mm or more.

The intermediate layer 12 is formed on an end face of the entrance window 11 on an internal space R side (vacuum side). The intermediate layer 12 contains at least one of $Al_2O_3$ (aluminum oxide), ZnO (zinc oxide), $HfO_2$ (hafnium oxide), and $TiO_2$ (titanium oxide).

The intermediate layer 12 is a barrier layer which blocks a reaction between lead contained in the entrance window 11 and the photoelectric surface 13. The intermediate layer 12 is a dense layer. The thickness of the intermediate layer 12 is equal to or less than the wavelength of Cherenkov light emitted by an interaction of the gamma rays with the entrance window 11. The thickness of the intermediate layer 12 is sufficiently smaller than the wavelength of Cherenkov light, for example, 100 Å (10 nm). The intermediate layer 12 is formed on the entrance window 11 on the internal space R side by atomic layer deposition (ALD).

The photoelectric surface 13 is formed on the end face of the entrance window 11 on the internal space R side via the intermediate layer 12. In the illustrated examples, the photoelectric surface 13 is a transmissive photoelectric surface. The photoelectric surface 13 emits photoelectrons from the internal space R side when light is incident from an entrance window 11 side. The photoelectric surface 13 is formed to contain an alkali metal. Examples of a material of the photoelectric surface 13 include alkali-antimony and the like. The photoelectric surface 13 constitutes a cathode.

The hermetic sealing material 14 is interposed between the entrance window 11 and the cylindrical member 15. The hermetic sealing material 14 hermetically seals between the entrance window 11 and the cylindrical member 15. The hermetic sealing material 14 has a ring shape. In the illustrated examples, the hermetic sealing material 14 is sandwiched between the intermediate layer 12 and the photoelectric surface 13 at a position corresponding to an outer edge portion of the entrance window 11 (see FIG. 3). The hermetic sealing material 14 has a function as a potential contact of the photoelectric surface 13 and a function as a reflective material for reflecting Cherenkov light emitted from the entrance window 11. The hermetic sealing material 14 is formed of a soft metal material at room temperature. The hermetic sealing material 14 is formed of, for example, Al (aluminum), In (indium) or the like.

The cylindrical member 15 constitutes at least a part of a side tube of the photomultiplier tube 10. The cylindrical member 15 includes, for example, a cylindrical body 15a made of Kovar and a cylindrical body 15b made of, for example, glass which is fused so as to communicate with the cylindrical body 15a. A focusing electrode 21, an electron multiplier section 22 and an anode (not shown) are accommodated in the cylindrical member 15. The focusing electrode 21 guides the photoelectrons emitted from the photoelectric surface 13 to the electron multiplier section 22. The electron multiplier section 22 includes a plurality of dynodes and multiplies the photoelectrons guided by the focusing electrode 21. The anode collects the photoelectrons multiplied in the electron multiplier section 22 and taken them out as an electrical signal to the outside. By applying heat and pressure in a state where the hermetic sealing material 14 and the entrance window 11 are overlapped on an end face of the cylindrical member 15, the cylindrical member 15 is closely connected with them.

The reflective material 16 is formed on an outer surface of the entrance window 11. Specifically, the reflective material 16 is formed on an end face of the entrance window 11 on a side opposite to the internal space R side and a side face (outer circumference face) of the entrance window 11. The reflective material 16 reflects Cherenkov light emitted from the entrance window 11. The reflective material 16 is formed of, for example, Al. The reflective material 16 also has a function as a light shielding film for shielding ambient light 2 (see FIG. 4).

In the gamma ray detector 1, as shown in FIG. 4, a gamma ray 3 passes through the reflective material 16 and is incident on the entrance window 11. The gamma ray 3 interacts with the entrance window 11 and Cherenkov light 4 is emitted. The Cherenkov light 4 travels toward the internal space R side or is reflected by the reflective material 16 and travels toward the internal space R side, is emitted from the entrance window 11, passes through the intermediate layer 12, and is incident on the photoelectric surface 13. As a result, electrons in the photoelectric surface 13 are excited, and photoelectrons 5 are emitted into the vacuum internal space R (external photoelectric effect). Thereafter, the photoelectrons 5 are accelerated and focused in the focusing electrode 21, electron multiplied in the electron multiplier section 22, and taken out as an electrical signal from the anode.

As described above, in the gamma ray detector 1, the entrance window 11 is a Cherenkov radiator. Thus, refraction and reflection of the light that can occur in a general detector, that is, refraction and reflection of the Cherenkov light 4 between the Cherenkov radiator and the optical adhesive or between the optical adhesive and the entrance window, do not exist in the first place. The Cherenkov light 4 can be efficiently collected.

By forming the intermediate layer 12, it is possible to prevent a reaction between the entrance window 11 which is a Cherenkov radiator and the photoelectric surface 13 formed of an alkali metal. It is possible to prevent coloring (blackening) of the entrance window 11 which is a Cherenkov radiator. It is possible to prevent the Cherenkov light 4 from being absorbed by the coloring.

Since the thickness of the intermediate layer 12 is equal to or less than the wavelength of the Cherenkov light 4, refraction and total reflection of the Cherenkov light 4 between the entrance window 11 which is a Cherenkov radiator and the intermediate layer 12 can be suppressed. The Cherenkov light 4 can be efficiently collected. As described above, according to the gamma ray detector 1, it is possible to improve the detection efficiency and temporal resolution of the gamma rays 3.

In the gamma ray detector 1, the intermediate layer 12 contains at least one of $Al_2O_3$, ZnO, $HfO_2$, and $TiO_2$. In this case, at least one of $Al_2O_3$, ZnO, $HfO_2$, and $TiO_2$ can be used as the intermediate layer 12.

In the gamma ray detector 1, the entrance window 11 which is a Cherenkov radiator contains at least one of $PbF_2$, $PbWO_4$, PbO, and lead glass. In this case, at least one of $PbF_2$, $PbWO_4$, PbO, and lead glass can be used as the entrance window 11 of the Cherenkov radiator. It is possible to improve an ability to block the gamma rays 3 at the entrance window 11.

In the gamma ray detector 1, the thickness of the entrance window 11 which is a Cherenkov radiator is a thickness capable of shielding the gamma rays 3 so that the transmittance of the gamma rays 3 is equal to or less than a specified value. This makes it possible to block the gamma rays 3 incident from the entrance window 11 which is a Cherenkov radiator so as to stop at the entrance window 11. It becomes possible to improve the ability to block the gamma rays 3, and eventually it is possible to block the gamma rays 3.

In the gamma ray detector 1, the entrance window 11 has a high lead content so that the Cherenkov light 4 reaches the photoelectric surface 13 without being attenuated as much as possible. As a result, a more compact (thin) gamma ray detector 1 can be realized.

Although the embodiment according to one mode of the present invention has been described above, one mode of the present invention is not limited to the above embodiment. In the above embodiment, the intermediate layer 12 is formed on the end face of the entrance window 11 on the internal space R side, but it may be formed on an end face of the entrance window 11 on an incident side or on the side face of the entrance window 11. It may be constituted so that the entrance window 11 is covered with the intermediate layer 12 by forming the intermediate layer 12 on an entire area of the outer surface of the entrance window 11. In the above embodiment, in some cases, at least one of the reflective material 16 and the hermetic sealing material 14 may not be necessary.

In the above embodiment, micro channel plate (MCP) can be used as the electron multiplier section 22. In particular, lead-free MCP (MCP containing no or little lead) can be used as the electron multiplier section 22. For example, when MCP containing lead glass is used for the electron multiplier section 22, the MCP itself interacts with radiation (γ ray), which may be a noise. By using a lead-free MCP, the radiation does not react with the MCP, so noise is reduced.

According to one aspect of the present invention, it is possible to provide a gamma ray detector capable of improving detection efficiency and temporal resolution of gamma rays.

What is claimed is:

1. A gamma ray detector detecting gamma rays, comprising:
    a photomultiplier tube having an entrance window and a photoelectric surface, wherein
    the entrance window is a Cherenkov radiator,
    the photoelectric surface is formed on a vacuum side surface of the entrance window via an intermediate layer, and
    a thickness of the intermediate layer is equal to or less than a wavelength of Cherenkov light emitted by an interaction of the gamma rays with the entrance window.

2. The gamma ray detector according to claim 1, wherein the intermediate layer contains at least one of $Al_2O_3$, ZnO, $HfO_2$, and $TiO_2$.

3. The gamma ray detector according to claim 2, wherein the entrance window which is a Cherenkov radiator contains at least one of $PbF_2$, $PbWO_4$, PbO, and lead glass.

4. The gamma ray detector according to claim 2, wherein the thickness of the entrance window which is a Cherenkov radiator is a thickness capable of shielding the gamma rays so that the transmittance of the gamma rays is equal to or less than a specified value.

5. The gamma ray detector according to claim 1, wherein the entrance window which is a Cherenkov radiator contains at least one of $PbF_2$, $PbWO_4$, PbO, and lead glass.

6. The gamma ray detector according to claim 5, wherein the thickness of the entrance window which is a Cherenkov radiator is a thickness capable of shielding the gamma rays so that the transmittance of the gamma rays is equal to or less than a specified value.

7. The gamma ray detector according to claim 1, wherein the thickness of the entrance window which is a Cherenkov radiator is a thickness capable of shielding the gamma rays so that the transmittance of the gamma rays is equal to or less than a specified value.

* * * * *